(12) United States Patent
Kouroutsidis

(10) Patent No.: US 11,823,234 B1
(45) Date of Patent: Nov. 21, 2023

(54) SYSTEMS AND METHODS FOR MANAGING ALTERNATIVE TARGETED EXPERIMENTAL CONTENT

(71) Applicants: Paul Kouroutsidis, Downingtown, PA (US); JPMORGAN CHASE BANK, N.A., New York, NY (US)

(72) Inventor: Paul Kouroutsidis, Downingtown, PA (US)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 17/935,373

(22) Filed: Sep. 26, 2022

(51) Int. Cl.
*G06Q 30/02* (2023.01)
*G06Q 30/0251* (2023.01)
*G06Q 30/0242* (2023.01)

(52) U.S. Cl.
CPC ..... *G06Q 30/0269* (2013.01); *G06Q 30/0245* (2013.01)

(58) Field of Classification Search
CPC .................. G06Q 30/0269; G06Q 30/0245
See application file for complete search history.

(56) References Cited

U.S. PATENT DOCUMENTS

| | | | | |
|---|---|---|---|---|
| 9,652,779 B2* | 5/2017 | Aviv | ............... | G06Q 30/0245 |
| 11,049,135 B2* | 6/2021 | Handcock | ......... | G06Q 30/0617 |
| 2012/0143675 A1* | 6/2012 | Aviv | ............... | G06Q 30/0245 |
| | | | | 705/14.44 |
| 2014/0040025 A1* | 2/2014 | Handcock | ......... | G06Q 30/0617 |
| | | | | 705/14.51 |

OTHER PUBLICATIONS

University of Chicago, "Do Targeted Discount Offers Serve as Advertising? Evidence form 70 Field Experiments", Pradeep Chintagunta (Year: 2015).*

* cited by examiner

*Primary Examiner* — Breffni Baggot
(74) *Attorney, Agent, or Firm* — GREENBERG TRAURIG LLP

(57) ABSTRACT

Systems and methods for managing alternative targeted experimental content are disclosed. A method for managing alternative advertisements may include an offer experience service computer program executed by an electronic device: (1) receiving a query for targeted content to display to a customer on a customer electronic device and an experimental content indicator; (2) based on the experimental content indicator, retrieving an experimental targeted content identifier for the customer from a third-party experimentation platform, wherein the experimental targeted content identifier identifies a variant of targeted content; (3) retrieving experimental targeted content associated with the experimental targeted content identifier from an experimental targeted content database; (4) generating a response to the query for targeted content comprising the experimental targeted content; and (5) returning the response to the customer electronic device. The customer electronic device displays the response including the experimental targeted content.

20 Claims, 3 Drawing Sheets

SYSTEMS AND METHODS FOR MANAGING ALTERNATIVE TARGETED EXPERIMENTAL CONTENT

BACKGROUND OF THE INVENTION

1. Field of the Invention

Embodiments generally relate to systems and methods for managing alternative targeted experimental content.

2. Description of the Related Art

Organizations often outsource targeting to third parties. In order to provide a uniform customer experience, normally only one third party is used to provide such targeted recommendations. This leads to inefficiencies as only the recommendations that are identified by that one third party are used.

SUMMARY OF THE INVENTION

Systems and methods for managing alternative targeted experimental content are disclosed. In one embodiment, a method for managing alternative advertisements may include: (1) receiving, at an offer experience service computer program executed by an electronic device, a query for targeted content to display to a customer on a customer electronic device and an experimental content indicator; (2) based on the experimental content indicator, retrieving, by the offer experience service computer program, an experimental targeted content identifier for the customer from a third-party experimentation platform, wherein the experimental targeted content identifier identifies a variant of targeted content; (3) retrieving, by the offer experience service computer program, experimental targeted content associated with the experimental targeted content identifier from an experimental targeted content database; (4) generating, by the offer experience service computer program, a response to the query for targeted content comprising the experimental targeted content; and (5) returning, by the offer experience service computer program, the response to the customer electronic device. The customer electronic device is configured to display the response including the experimental targeted content.

In one embodiment, the method may also include monitoring, by the offer experience service computer program, a customer response received at the customer electronic device based on the association; and outputting, by the offer experience service computer program, metrics associated with the customer response.

In one embodiment, wherein the customer response may include a clickthrough or an acceptance.

In one embodiment, the method may also include retrieving, by the offer experience service computer program, dynamic variables for the experimental targeted content.

In one embodiment, the third-party experimentation may split a customer population into a plurality of sub-populations, wherein each sub-population is associated with one of a plurality of experimental targeted contents.

In one embodiment, the method may also include persisting, by the offer experience service computer program, an association between the customer and the experimental targeted content identifier.

In one embodiment, a centralized recommendation engine computer program may select the experimental content indicator based on products used by the customer.

According to another embodiment, a system may include a customer electronic device computer program executed by a customer electronic device; an offer experience service computer program in communication with the customer electronic device computer program; a centralized recommendation engine computer program executed by a centralized recommendation engine; a third party experimentation platform; and a targeted experimentation content database. The centralized recommendation engine may provide an experimental content indicator to the customer electronic device computer program. The offer experience service computer program may receive a query for targeted content to display to a customer on the customer electronic device and the experimental content indicator. Based on the experimental content indicator, the offer experience service computer program may request an experimental targeted content identifier for the customer from a third-party experimentation platform. The third-party experimentation platform may identify a variant of targeted content and returns the experimental targeted content identifier to the offer experience service computer program. The offer experience service computer program may retrieve experimental targeted content associated with the experimental targeted content identifier from an experimental targeted content database, may generate a response to the query for targeted content comprising the experimental targeted content; and may return the response to the customer electronic device. The customer electronic device computer program may display the response including the experimental targeted content.

In one embodiment, the offer experience service computer program may monitor a customer response received at the customer electronic device based on the association and outputs metrics associated with the customer response.

In one embodiment, the customer response may include a clickthrough or an acceptance.

In one embodiment, the system may also include a dynamic content database, and the offer experience service computer program may retrieve dynamic variables for the experimental targeted content from the dynamic content database.

In one embodiment, the third-party experimentation platform may split a customer population into a plurality of sub-populations, wherein each sub-population is associated with one of a plurality of experimental targeted contents.

In one embodiment, the offer experience service computer program may persist an association between the customer and the experimental targeted content identifier.

In one embodiment, the centralized recommendation engine computer program may select the experimental content indicator based on products used by the customer.

According to another embodiment, a non-transitory computer readable storage medium, including instructions stored thereon, which when read and executed by one or more computer processors, may cause the one or more computer processors to perform steps comprising: receiving a query for targeted content to display to a customer on a customer electronic device and an experimental content indicator; based on the experimental content indicator, retrieving an experimental targeted content identifier for the customer from a third-party experimentation platform, wherein the experimental targeted content identifier identifies a variant of targeted content; retrieving experimental targeted content associated with the experimental targeted content identifier from an experimental targeted content database; generating a response to the query for targeted content comprising the experimental targeted content; and returning the response to the customer electronic device. The customer electronic device may display the response including the experimental targeted content.

In one embodiment, the non-transitory computer readable storage medium may also include instructions stored thereon, which when read and executed by one or more computer processors, cause the one or more computer processors to monitor a customer response received at the customer electronic device based on the association and output metrics associated with the customer response.

In one embodiment, the non-transitory computer readable storage medium may also include instructions stored thereon, which when read and executed by one or more computer processors, cause the one or more computer processors to retrieve dynamic variables for the experimental targeted content.

In one embodiment, the non-transitory computer readable storage medium may also include instructions stored thereon, which when read and executed by one or more computer processors, cause the one or more computer processors to split a customer population into a plurality of sub-populations, wherein each sub-population is associated with one of a plurality of experimental targeted contents.

In one embodiment, the non-transitory computer readable storage medium may also include instructions stored thereon, which when read and executed by one or more computer processors, cause the one or more computer processors to persist an association between the customer and the experimental targeted content identifier.

In one embodiment, the non-transitory computer readable storage medium may also include instructions stored thereon, which when read and executed by one or more computer processors, cause the one or more computer processors to select the experimental content indicator based on products used by the customer.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

The disclosures of U.S. Provisional patent application Ser. No. 17/457,606, filed Dec. 3, 2022, and of U.S. Provisional patent application Ser. No. 17/484,902, filed Sep. 24, 2021, are hereby incorporated, by reference, in their entireties.

Embodiments are generally directed to systems and methods for managing alternative targeted experimental content. For example, embodiments may facilitate the selection of alternative targeted experimental content. In one embodiment, a computer program or application, using a communication channel, may solicit targeted content ad from an advertisement recommendation engine with additional criteria. The recommendation engine may pass a flag, such as an experiment enabled flag, and a generic targeted content identifier to the channel. A computer program or application may use the criteria to determine if an additional call is needed to a third-party experimentation platform. If a call is needed, a third-party experimentation platform may identify the targeted experimental content for the customer, such as a variant of content. The third-party experimentation platform may persist an association between the variant of the targeted experimental content the customer received so that other channel queries can maintain the same variant.

In one embodiment, the third-party experimentation platform may be used to set up and manage an experimental campaign. For example, the third-party experimentation platform may split an initial population of customers into two or more populations, which each population receiving a variant of experimental targeted content. The population may be split randomly, may be based on a demographic, the channel, the type of customer electronic device being used, a rotation, a prior experience with the customer, products used by different customer groups, combinations thereof, etc. Any grouping may be used as is necessary and/or desired.

The third-party experimentation platform may persist this split. Thus, as customers interact with the targeted experimental content, their reactions may be associated with the specific variant that was provided. The third-party experimentation platform may output a targeted experimental content identifier that the channels may use to retrieve the specific content for the targeted experimental content.

Figure 1:
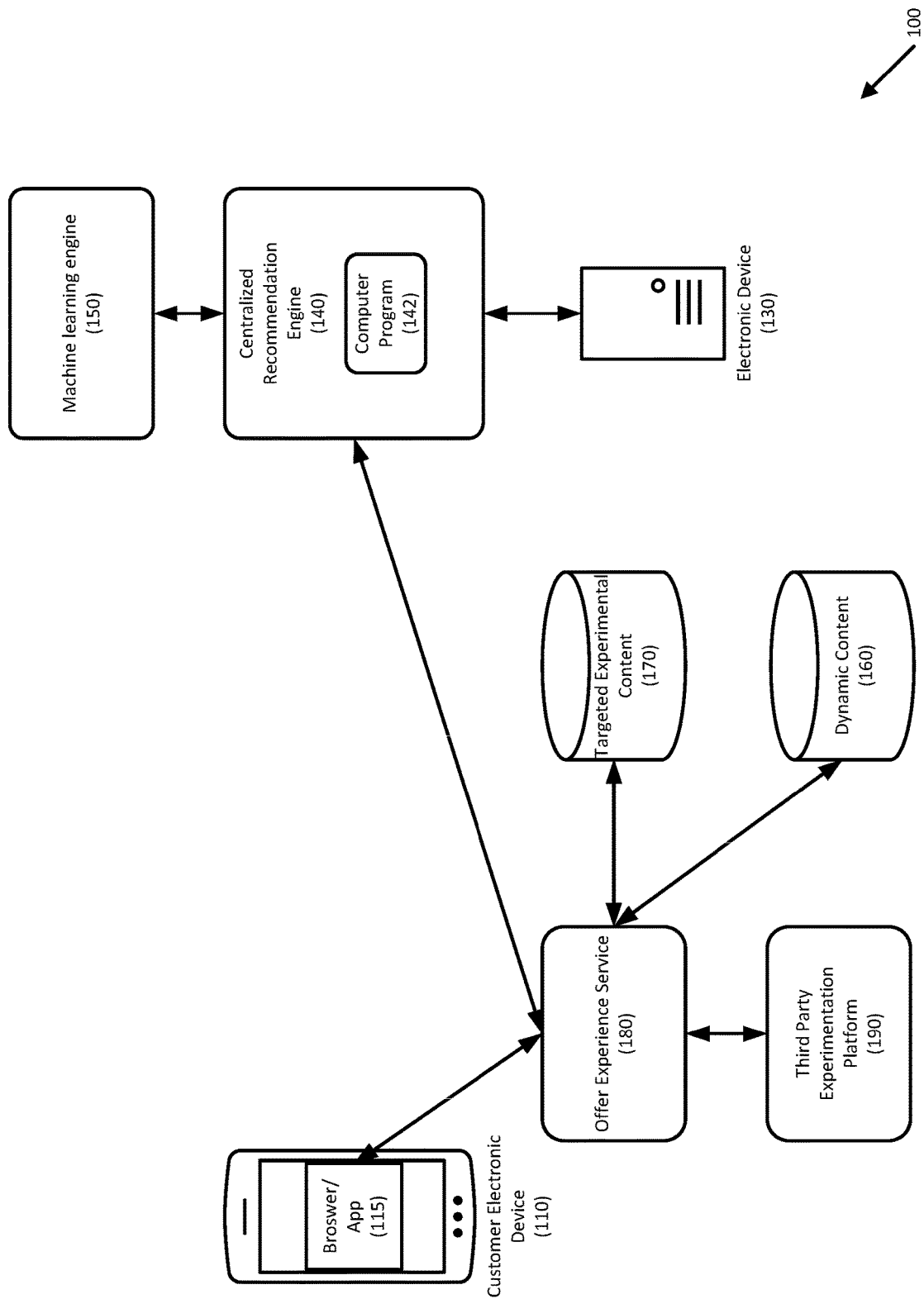
FIG. 1 depicts a system for managing alternative targeted experimental content according to an embodiment.

Referring to FIG. 1, a system for managing alternative targeted experimental content is disclosed according to one embodiment. System 100 may include electronic device 130 that may execute centralized recommendation engine 140, which may execute centralized recommendation engine computer program 142. Electronic device 130 may be any suitable electronic device, including servers (e.g., physical and/or cloud-based servers), workstations, computers, etc.

Customer electronic device 110 may execute browser or application 115. Customer electronic device 110 may be any suitable electronic device, including computers (e.g., desktops, laptops, tablets), smartphones and smart devices, Internet of Things devices, etc.

System 100 may include machine learning engine 150 that may include one or more trained machine learning models. In one embodiment, the machine learning models may be used to identify whether to provide targeted experimental content. The model(s) may be trained using historical data for the customer, for similar customers, etc.

System 100 may further include offer experience service 180. Offer experience service 180 may retrieve and present all offers that a customer is eligible to receive. In one embodiment, the customer may access offer experience service 180 via browser or application 115.

System 100 may include third-party experimentation platform 190. Third-party experimentation platform 190 may interface with offer experience service 180. Third-party experimentation platform 190 may randomly split an initial population of customers into two or more populations, which each population receiving a variant on a targeted advertisement. Third-party experimentation platform 190 may persist this split. Thus, as customers interact with the targeted experimental content, their reactions may be associated with the specific variant that was provided. Third-party experimentation platform 190 may output, to offer experience service 180, a targeted content ID that the channels may use to retrieve the specific content for the targeted experimental content.

Offer experience service 180 may receive targeted experimental content identifiers for targeted experimental content and may retrieve targeted experimental content for targeted experimental content from targeted experimental content database 170.

Offer experience service 180 may further retrieve dynamic variables from dynamic content database 160. Dynamic variables may include, for example, personalized product or service offers (e.g., pre-approved credit limits, mortgage limits, auto loans, etc.), calculated insights (e.g., information on current spend by category every month), etc. Other dynamic data may be included as is necessary and/or desired.

Figure 2:
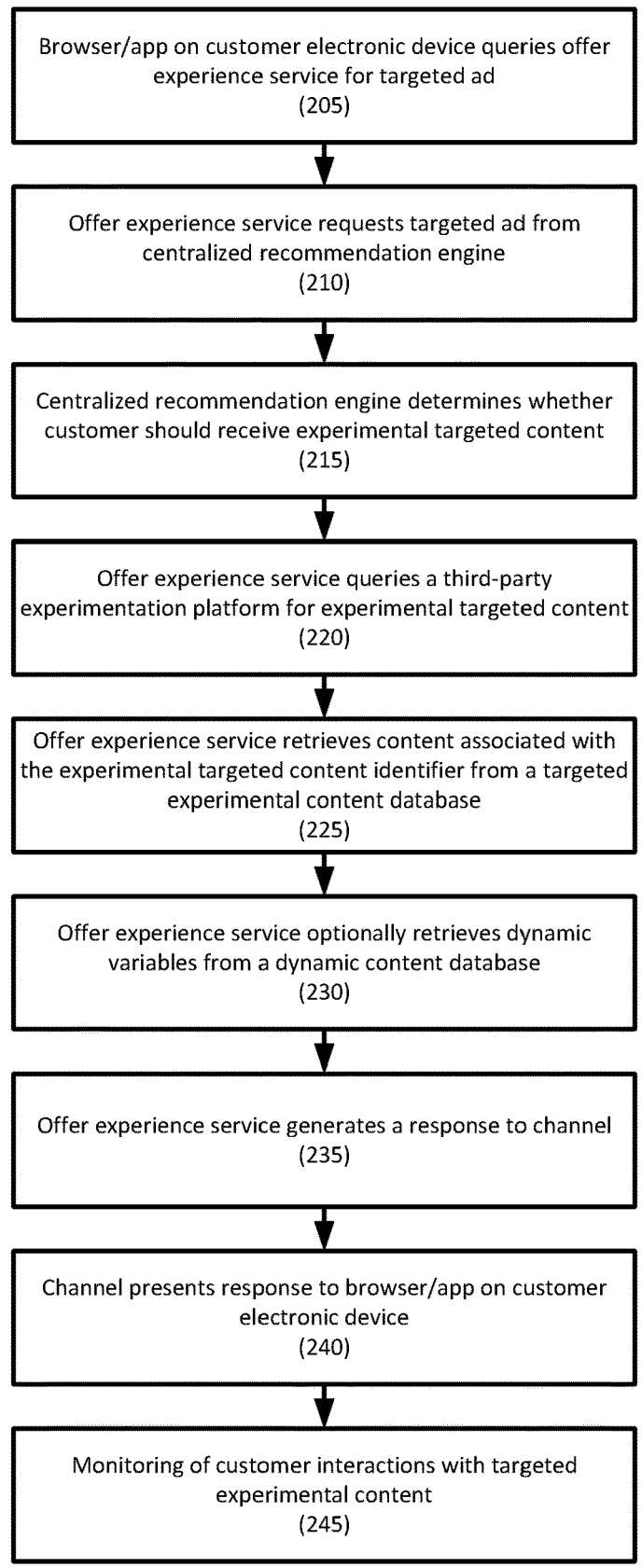
FIG. 2 depicts a method for managing alternative targeted experimental content according to an embodiment.

Referring to FIG. 2, a method for managing alternative advertisements is disclosed according to an embodiment.

In step 205, a browser or computer application executed on a customer electronic device may query an offer experience service for a targeted ad. The query may identify a targeted message tile to fill with targeted content.

In step 210, the offer experience service may query a centralized recommendation engine computer program for the targeted content and may provide a customer identifier.

In step 215, the centralized recommendation engine computer program may identify the customer and may determine whether the customer should be provided with experimental targeted content. For example, the centralized recommendation engine computer program may return an indicator as to whether the customer is selected to receive experimental targeted content. In one embodiment, the indicator may be a flag (e.g., a yes/no flag), etc.

In one embodiment, the selection to receive the experimental targeted content may be random, may be based on a customer demographic, may be based on the channel, may be based on the type of customer electronic device being used, may be based on a rotation, may be based on a prior experience with the customer, may be based on products used by different customer groups (e.g., credit card types, mortgages, account types, etc.), combinations thereof, etc. Any grouping may be used as is necessary and/or desired.

In step 220, based on the indicator, the offer experience service may query a third-party experimentation platform with a request for experimental targeted content for the customer.

In step 225, the third-party experimentation platform may identify the experimental targeted content for the customer. In one embodiment, the third-party experimentation platform may split the customer population into a plurality of groups, with each group associated with a particular experimental targeted content identifier. In one embodiment, the customer population may be split into the plurality of groups as part of the campaign set-up; in another embodiment, the third-party experimentation platform may split the customer population into the plurality of groups on-the-fly. The customers may be split randomly, pseudo-randomly, or in any way necessary and/or desired.

In one embodiment, the third-party experimentation platform may return an identifier, such as an experimental targeted content identifier, to the offer experience service.

The third-party experimentation platform may persist the association between the customer and the experimental targeted content provided.

In step 225, the offer experience service may retrieve content associated with the experimental targeted content identifier from a targeted experimental content database.

In step 230, the offer experience service may optionally retrieve dynamic variables from a dynamic content database. For example, the dynamic variables may include personalized product or service offers (e.g., pre-approved credit limits, mortgage limits, auto loans, etc.), calculated insights (e.g., information on current spend by category every month), etc. Other dynamic variables may be included as is necessary and/or desired. In another embodiment, the dynamic variables may be requested from a system of record.

In step 235, the offer experience service may generate a response, which may include the experimental targeted content, to the channel, and in step 240, the channel may present the experimental targeted content to the customer.

In step 245, the offer experience service may track the customers' responses to the targeted content, such as click-throughs, interactions, acceptances, etc. The offer experience service may also retrieve the variant of the experimental content that was presented based on, for example, the persisted association. Metrics collected may be provided to downstream systems, marketers, etc. to determine the success of the experimental content.

Figure 3:
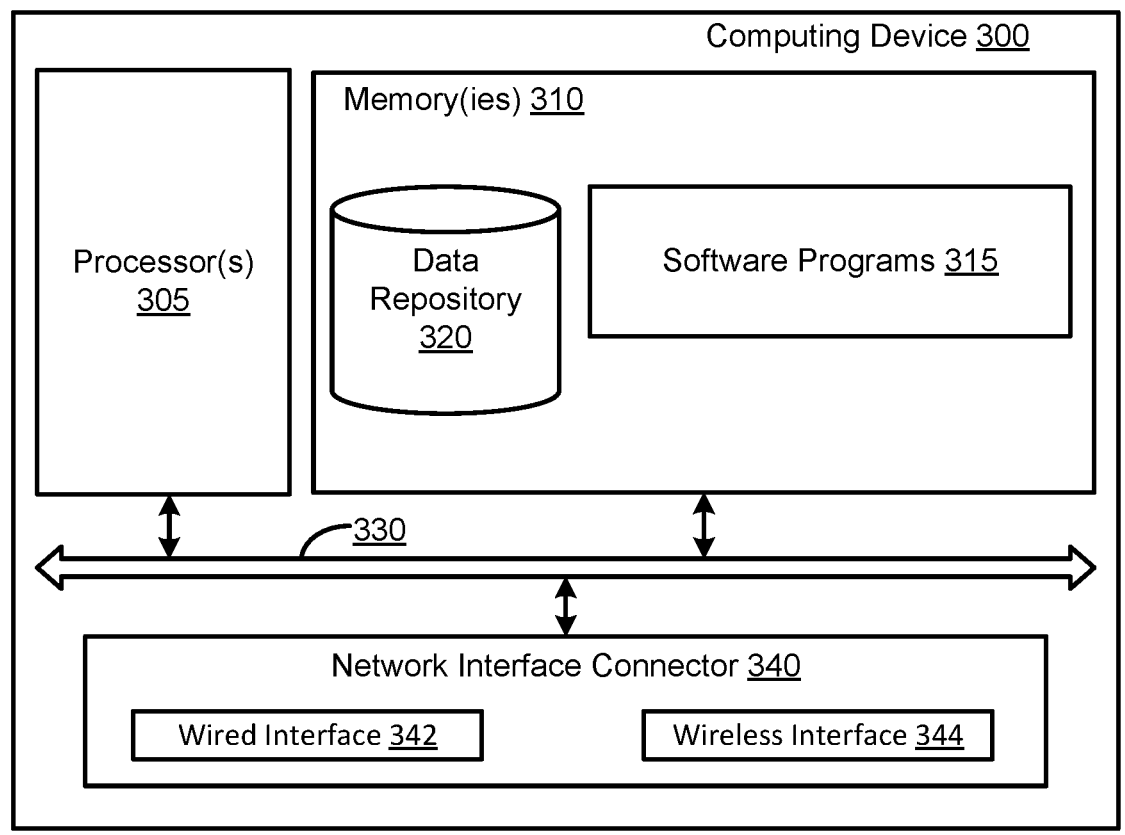
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for managing alternative advertisements, comprising:
   receiving over a communication channel, at an offer experience service computer program executed by an electronic device, a query for targeted content to display to a customer on a customer electronic device and an experimental content indicator;
   based on the experimental content indicator, retrieving, by the offer experience service computer program, an experimental targeted content identifier for the customer from a third-party experimentation platform, wherein the experimental targeted content identifier identifies a variant of targeted content, wherein the experimental targeted content identifier is retrieved from the third-party experimentation platform by:
      receiving over the communication channel from a centralized recommendation engine computer program, an experiment enabled flag and a generic targeted content identifier; and
      calling the third-party experimentation platform to identify the variant of targeted content, wherein the third-party experimentation platform persists an association between the variant of targeted content to maintain the variant of targeted content for other queries for the targeted content over the communication channel;
   retrieving, by the offer experience service computer program, experimental targeted content associated with the experimental targeted content identifier from an experimental targeted content database;
   generating, by the offer experience service computer program, a response to the query for targeted content comprising the experimental targeted content; and
   returning, by the offer experience service computer program, the response to the customer electronic device;
   wherein the customer electronic device is configured to display the response including the experimental targeted content.

2. The method of claim 1, further comprising:
   monitoring, by the offer experience service computer program, a customer response received at the customer electronic device based on the association; and
   outputting, by the offer experience service computer program, metrics associated with the customer response.

3. The method of claim 2, wherein the customer response comprises a clickthrough or an acceptance.

4. The method of claim 1, further comprising:
   retrieving, by the offer experience service computer program, dynamic variables for the experimental targeted content.

5. The method of claim 1, wherein the third-party experimentation platform is configured to split a customer population into a plurality of sub-populations, wherein each sub-population is associated with one of a plurality of experimental targeted contents.

6. The method of claim 1, wherein the centralized recommendation engine computer program is configured to select the experimental content indicator based on products used by the customer.

7. A system, comprising:
   a customer electronic device computer program executed by a customer electronic device;
   an offer experience service computer program in communication with the customer electronic device computer program;
   a centralized recommendation engine computer program executed by a centralized recommendation engine;
   a third-party experimentation platform; and
   an experimental targeted content database;
   wherein:
   the centralized recommendation engine provides an experimental content indicator to the customer electronic device computer program;
   the offer experience service computer program receives, over a communication channel, a query for targeted content to display to a customer on the customer electronic device and the experimental content indicator;
   based on the experimental content indicator, the offer experience service computer program requests an experimental targeted content identifier for the customer from the third-party experimentation platform;
   the third-party experimentation platform identifies a variant of targeted content and returns the experimental targeted content identifier to the offer experience service computer program, wherein the experimental targeted content identifier is returned to the offer experience computer program by:
  receiving over the communication channel from a centralized recommendation engine, an experiment enabled flag and a generic targeted content identifier; and
  calling the third-party experimentation platform to identify the variant of targeted content, wherein the third-party experimentation platform persists an association between the variant of targeted content to maintain the variant of targeted content for other queries for the targeted content over the communication channel;
the offer experience service computer program retrieves experimental targeted content associated with the experimental targeted content identifier from the experimental targeted content database;
the offer experience service computer program generates a response to the query for targeted content comprising the experimental targeted content;
the offer experience service computer program returns the response to the customer electronic device; and
the customer electronic device computer program displays the response including the experimental targeted content.

8. The system of claim 7, wherein the offer experience service computer program monitors a customer response received at the customer electronic device based on the association and outputs metrics associated with the customer response.

9. The system of claim 8, wherein the customer response comprises a clickthrough or an acceptance.

10. The system of claim 7, further comprising a dynamic content database, and the offer experience service computer program retrieves dynamic variables for the experimental targeted content from the dynamic content database.

11. The system of claim 7, wherein the third-party experimentation platform splits a customer population into a plurality of sub-populations, wherein each sub-population is associated with one of a plurality of experimental targeted contents.

12. The system of claim 7, wherein the centralized recommendation engine computer program selects the experimental content indicator based on products used by the customer.

13. A non-transitory computer readable storage medium, including instructions stored thereon, which when read and executed by one or more computer processors, cause the one or more computer processors to perform steps comprising:
  receiving, over a communication channel, a query for targeted content to display to a customer on a customer electronic device and an experimental content indicator;
  based on the experimental content indicator, retrieving an experimental targeted content identifier for the customer from a third-party experimentation platform, wherein the experimental targeted content identifier identifies a variant of targeted content, wherein the experimental targeted content identifier is retrieved from the third-party experimentation platform by:
    receiving over the communication channel from a centralized recommendation engine computer program, an experiment enabled flag and a generic targeted content identifier; and
    calling the third-party experimentation platform to identify the variant of targeted content, wherein the third-party experimentation platform persists an association between the variant of targeted content to maintain the variant of targeted content for other queries for the targeted content over the communication channel;
  retrieving experimental targeted content associated with the experimental targeted content identifier from an experimental targeted content database;
  generating a response to the query for targeted content comprising the experimental targeted content; and
  returning the response to the customer electronic device;
  wherein the customer electronic device is configured to display the response including the experimental targeted content.

14. The non-transitory computer readable storage medium of claim 13, further including instructions stored thereon, which when read and executed by one or more computer processors, cause the one or more computer processors to monitor a customer response received at the customer electronic device based on the association and output metrics associated with the customer response.

15. The non-transitory computer readable storage medium of claim 13, further including instructions stored thereon, which when read and executed by one or more computer processors, cause the one or more computer processors to retrieve dynamic variables for the experimental targeted content.

16. The non-transitory computer readable storage medium of claim 13, further including instructions stored thereon, which when read and executed by one or more computer processors, cause the one or more computer processors to split a customer population into a plurality of sub-populations, wherein each sub-population is associated with one of a plurality of experimental targeted contents.

17. The non-transitory computer readable storage medium of claim 13, further including instructions stored thereon, which when read and executed by one or more computer processors, cause the one or more computer processors to select the experimental content indicator based on products used by the customer.

18. The method of claim 5, wherein the third-party experimentation platform is configured to split the customer population into the plurality of sub-populations by pseudo-randomly splitting the customer population.

19. The system of claim 11, wherein the third-party experimentation platform is configured to split the customer population into the plurality of sub-populations by pseudo-randomly splitting the customer population.

20. The non-transitory computer readable storage medium of claim 16, further including instructions stored thereon, which when read and executed by one or more computer processors, cause the one or more computer processors to pseudo-randomly split the customer population into the plurality of sub-populations.

* * * * *